UNITED STATES PATENT OFFICE.

JOHN HOBRECKER, OF QUINCY, ILLINOIS.

IMPROVEMENT IN COMPOSITIONS FOR ROOFING.

Specification forming part of Letters Patent No. 23,248, dated March 15, 1859.

*To all whom it may concern:*

Be it known that I, JOHN HOBRECKER, of the city of Quincy, in the county of Adams and State of Illinois, have invented a new and useful composition of matter and a new and useful process for preparing the same; and I hereby declare that the following is a full, clear, and exact description thereof to enable those skilled in the art to compound and prepare the same.

I provide a suitable covered vessel of iron, in which I place, first, two parts of unslaked lime, then one part of pulverized cannel-coal, one part of pulverized asphaltum, and one part of coal-tar. The cover of the vessel is then bolted down and a small quantity of water introduced through a hole which is left in the cover. The hole is then stopped with a plug. The heat evolved from the lime during the process of slaking, which takes place upon the introduction of the water, causes a violent ebullition of the mass and an intimate admixture and amalgamation of the several ingredients sooner and more perfectly and economically than if they were subjected to the action of fire applied to the outside of the vessel. The saving in fuel is an important advantage in this mode of preparing the compound.

The result of the above-described process, when sufficiently cool, is reduced by grinding to a fine powder. It is then tempered to a proper consistency by mixing it, if required for roofing purposes, with coal-tar or its equivalent. When spread sand or gravel may be added. If used as paint on shingles or boards, spirits of turpentine or its equivalent may be used for tempering.

I do not confine myself to the precise proportions above named.

What I claim as my invention, and desire to secure by Letters Patent, is—

The process above described of preparing plastic material of the composition stated without the aid of external heat, for the purposes set forth.

In testimony whereof I have signed my name to this specification before two subscribing witnesses.

JOHN HOBRECKER.

Witnesses:
I. N. MORRIS,
AUSTIN BROOKS.